(12) United States Patent
Hamidi-Rad et al.

(10) Patent No.: US 11,119,567 B2
(45) Date of Patent: Sep. 14, 2021

(54) METHOD AND APPARATUS FOR PROVIDING IMMERSIVE REALITY CONTENT

(71) Applicant: INTERDIGITAL CE PATENT HOLDINGS, Paris (FR)

(72) Inventors: Shahab Hamidi-Rad, Sunnyvale, CA (US); Kent Lyons, Mountain View, CA (US); Alan Zhang, Atlanta, GA (US)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 16/496,857

(22) PCT Filed: Feb. 27, 2018

(86) PCT No.: PCT/US2018/019809
§ 371 (c)(1),
(2) Date: Sep. 23, 2019

(87) PCT Pub. No.: WO2018/175053
PCT Pub. Date: Sep. 27, 2018

(65) Prior Publication Data
US 2020/0097068 A1  Mar. 26, 2020

Related U.S. Application Data
(60) Provisional application No. 62/475,310, filed on Mar. 23, 2017.

(51) Int. Cl.
*G09G 5/00* (2006.01)
*G06F 3/01* (2006.01)
(Continued)

(52) U.S. Cl.
CPC ............ *G06F 3/011* (2013.01); *G02B 27/017* (2013.01); *G06F 3/04815* (2013.01); *G06F 2203/04806* (2013.01)

(58) Field of Classification Search
CPC ....... G06T 19/006; G06T 19/00; G06F 3/011; G06F 3/012; G02B 27/017
(Continued)

(56) References Cited

U.S. PATENT DOCUMENTS 7,071,897 B2   7/2006 Bronson
2014/0051510 A1   2/2014 Benko et al.
(Continued)

FOREIGN PATENT DOCUMENTS

MX   2015006874   1/2016
WO   WO16204916   12/2016

OTHER PUBLICATIONS

ISR for PCT2018/019809 dated May 4, 2018.

*Primary Examiner* — Gordon G Liu
(74) *Attorney, Agent, or Firm* — Lily Neff

(57) ABSTRACT

A method of providing immersive reality content includes determining a field of view intersection between a first field of view from a first device and a second field of view from a second device, generating a first immersive reality content based on the field of view intersection and providing the first immersive reality content. An apparatus for providing immersive reality content includes a processor and at least one memory coupled to the processor, the processor being configured to determine a field of view intersection between a first field of view from a first device and a second field of view from a second device, generate a first immersive reality content based on the field of view intersection and provide the first immersive reality content. A computer-readable storage medium, computer program and a non-transitory article of manufacture are also described.

26 Claims, 9 Drawing Sheets

(51) Int. Cl.
*G02B 27/01* (2006.01)
*G06F 3/0481* (2013.01)

(58) Field of Classification Search
USPC .......................................... 345/633
See application file for complete search history.

(56) References Cited

U.S. PATENT DOCUMENTS

| | | |
|---|---|---|
| 2014/0152558 A1 | 6/2014 | Salter et al. |
| 2014/0313189 A1 | 10/2014 | Dominici et al. |
| 2015/0205106 A1 | 7/2015 | Norden et al. |
| 2016/0026253 A1* | 1/2016 | Bradski ............... H04N 13/344 345/8 |
| 2016/0370855 A1* | 12/2016 | Lanier .................... G06F 3/005 |
| 2018/0004285 A1* | 1/2018 | Castleman ............. G06F 3/011 |

* cited by examiner

METHOD AND APPARATUS FOR PROVIDING IMMERSIVE REALITY CONTENT

This application claims the benefit, under 35 U.S.C. § 365 of International Application PCT/US2018/019809, filed 27 Feb. 2018, which was published in accordance with PCT Article 21(2) on 27 Sep. 2018 in English and which claims the benefit of U.S. Provisional Application No. 62/475,310, filed 23 Mar. 2017

TECHNICAL FIELD

The present disclosure relates to immersive reality, in particular, to providing immersive reality content through multiple complementary devices.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Immersive technology refers to technology that blurs the line between the physical world or reality and digital or simulated world or reality, thereby creating a sense of immersion and includes virtual reality, augmented reality and variants like mixed reality and merged reality. Virtual Reality (VR) has been defined as a realistic and immersive simulation of a three-dimensional environment, created using interactive software and hardware, and experienced or controlled by movement of the body or, simply put, an immersive, interactive experience generated by a computer. A person using VR equipment is typically able to "look around" the artificial world, move about in it and interact with features or items that are depicted on a screen or in goggles. Virtual realities artificially create sensory experiences, which may include sight, touch, hearing, and, less commonly, smell. Augmented Reality (AR) (and variants like mixed reality and merged reality) is a live direct or indirect view of a physical, real-world environment whose elements are augmented (or supplemented) by computer-generated sensory input such as sound, video, graphics or GPS data. It is related to a more general concept called mediated reality in which a view of reality is modified (possibly even diminished rather than augmented) by a computer. As a result, the technology functions by enhancing one's current perception of reality. By contrast, virtual reality replaces the real world with a simulated one. In the following, we will jointly refer to these various technologies as Immersive Reality (IR). Immersive realities may be displayed either on a computer monitor, a projector screen, or with a immersive reality headset (also called head-mounted display or HMD). HMDs typically take the form of head-mounted goggles or glasses with a screen in front of the eyes. Some simulations may include additional sensory information and provide sounds through speakers or headphones. Additionally, gloves or hand wearable devices fitted with sensors may be utilized.

In recent years, IR has become the subject of increased attention. This is because VR can be used practically in every field to perform various functions including test, entertain and teach. For example, engineers and architects can use VR in modeling and testing of new designs. Doctors can use VR to practice and perfect difficult operations ahead of time and military experts can develop strategies by simulating battlefield operations. Printed marketing material can be designed with certain "trigger" images that, when scanned by an AR enabled device using image recognition, activate a video version of the promotional material. AR can aid in visualizing building projects or archeological research. IR is also used extensively in the gaming and entertainment industries to provide interactive experiences and enhance audience enjoyment. IR enables the creation of a simulated environment that feels real and can accurately duplicate real life experiences in real or imaginary worlds. Furthermore, IR covers remote communication environments which provide virtual presence of users with the concepts of telepresence and telexistence or virtual artifact (VA).

Recently there has been a growth of available large field-of-view IR content (up to 360°), also called immersive or panoramic. Such content is potentially not fully visible by a user watching the content on immersive display devices such as mounted displays, smart glasses, PC screens, tablets, smartphones and the like. That means that at a given moment, a user may only be viewing a part of the content. However, a user can typically navigate within the content by various means such as head movement, mouse movement, touch screen, voice and the like.

One issue associated with IR glasses or HMDs is that they may not have high resolution displays. As a result, the user experience is not as strong and zooming may be limited. Other devices like handheld display devices (e.g., tablets, smart phones) do have higher resolution. It is therefore of interest to create IR systems where at least one device of higher resolution is used to complement at least one device of lower resolution. The present disclosure describes such a system.

SUMMARY

According to an aspect of the present disclosure, a method is provided including determining a field of view intersection between a first field of view from a first device and a second field of view from a second device, generating a first immersive reality (IR) content based on the field of view intersection and providing the first IR content.

According to an aspect of the present disclosure, an apparatus is provided including a processor and at least one memory coupled to the processor, the processor being configured to determine a field of view intersection between a first field of view from a first device and a second field of view from a second device, generate a first immersive reality (IR) content based on the field of view intersection and provide the first IR content.

According to an aspect of the present disclosure, a computer-readable storage medium is provided carrying a software program including program code instructions for performing any of the embodiments of the method described above.

According to an aspect of the present disclosure, a non-transitory article of manufacture is provided tangibly embodying computer readable program code instructions which, when executed, cause a computer to perform any of the embodiments of the method described above.

According to one aspect of the present disclosure, a computer program, comprising code instructions executable by a processor for implementing any of the embodiments the method described above.

The above presents a simplified summary of the subject matter in order to provide a basic understanding of some aspects of subject matter embodiments. This summary is not an extensive overview of the subject matter. It is not intended to identify key or critical elements of the embodiments or to delineate the scope of the subject matter. Its sole purpose is to present some concepts of the subject matter in a simplified form as a prelude to the more detailed description that is presented later.

Additional features and advantages of the present disclosure will be made apparent from the following detailed description of illustrative embodiments which proceeds with reference to the accompanying figures.

BRIEF DESCRIPTION OF THE DRAWINGS

The present disclosure may be better understood in accordance with the following exemplary figures briefly described below.

DETAILED DISCUSSION OF THE EMBODIMENTS

Figure 1:
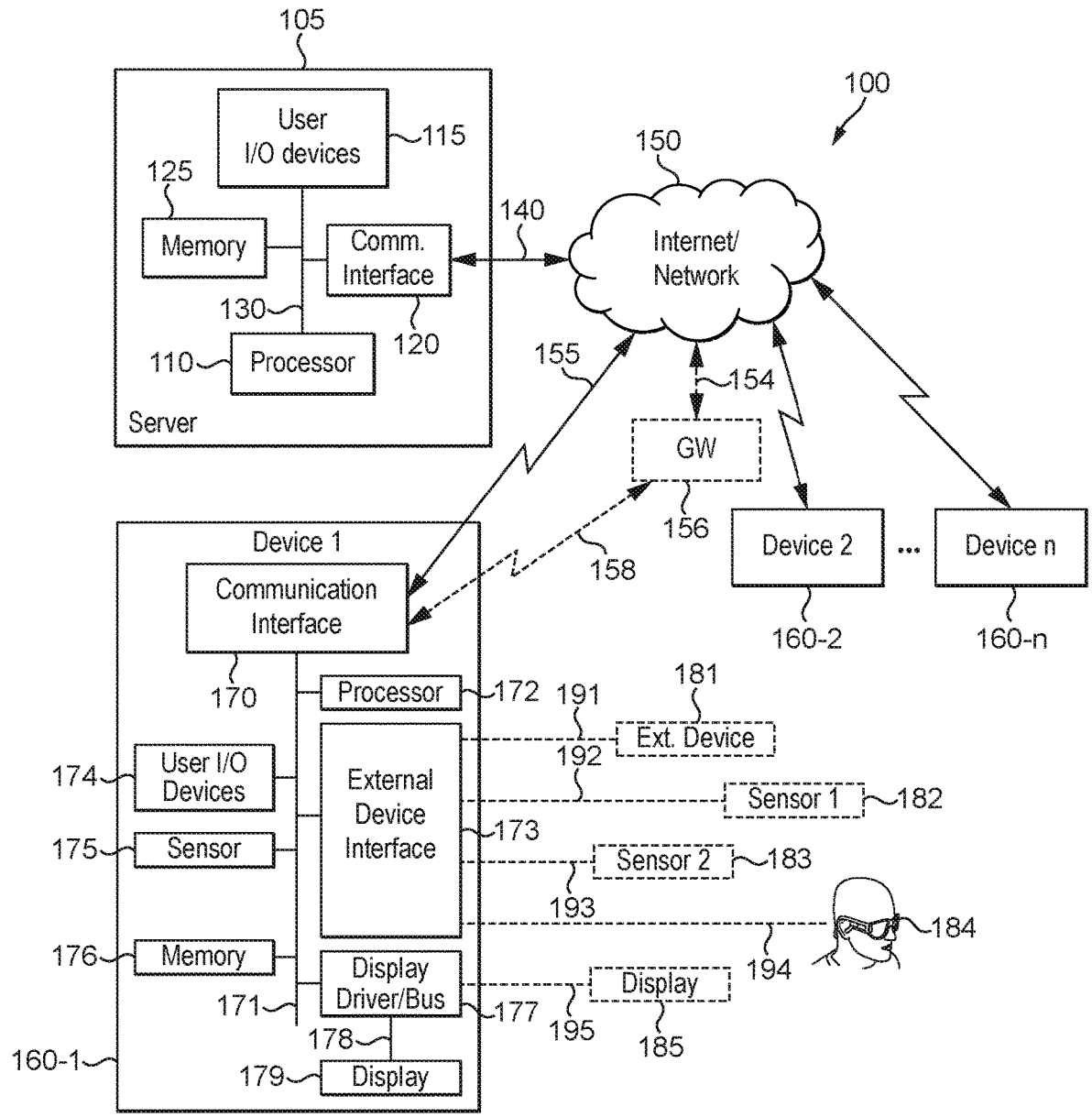
FIG. 1 illustrates a simplified block diagram of an exemplary immersive reality system in accordance with an embodiment of the present disclosure.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with, through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The present disclosure is directed to immersive reality (IR) systems where at least one device of higher resolution may be used to complement the view of at least one device of lower resolution. For example, IR glasses or HMDs may not have high resolution displays in terms of pixels per degree on the field of view, or angular pixel density (similar to dots per inch (DPI), or pixels per inch (PPI) on a planar display). This is mostly due to weight and power constraints, as well as size (volume) and optics and tradeoffs between field of view and pixel density. As a result, the user experience is not as strong and zooming may be limited, hindered by the low resolution. Others devices like handheld display devices (e.g., tablets, smart phones) do have higher resolution and may be used to complement the HMD display, albeit occupying a smaller percentage of the user's field of view. Combining an IR display device (e.g., HMD) with a handheld display device with high resolution display may provide both a wide field of view and a high resolution view to at least a selected portion of the view (window). In the following disclosure, a field of view represents the total amount of space that you can see from a particular point. The particular point may be a person's eyes or a camera position. It is understood that the person is not moving the head or the body, in case the person is holding the camera.

FIG. 1 illustrates a simplified block diagram of an exemplary immersive reality system 100 in accordance with an embodiment of the present disclosure. System 100 may process immersive reality content, hereby including at least one of virtual reality, augmented reality, augmented virtuality, mixed reality, merged reality, etc. System 100 may include a server or service provider 105 which is capable of receiving and processing user requests from one or more of user devices 160-1 to 160-$n$. The server 105 may be, for example, a content server. The content server, in response to a user request for content, may provide program content including various multimedia assets such as, but not limited to, movies or TV shows for viewing, streaming or downloading by users using the devices 160-1 to 160-$n$, or coupled to the devices 160-1 to 160-$n$. The devices 160-1 to 160-$n$ may be any consumer electronic device, e.g., a gateway, a settop box, a television, a computer, a laptop, a tablet, a smart phone, etc. The server or service provider may provide other services besides content delivery.

Various exemplary user devices 160-1 to 160-$n$ may communicate with the exemplary server 105 and/or each other (e.g., in an multi-user VR game or AR experience) over a communication network 150 such as the Internet, a wide area network (WAN), and/or a local area network (LAN). Server 105 may communicate with user devices 160-1 to 160-$n$ in order to provide and/or receive relevant information such as recommendations, user ratings, metadata, web pages, media contents, sales offers, sales requests, etc., to and/or from user devices 160-1 to 160-$n$ thru the network connections. Server 105 may also provide additional processing of information and data when the processing is not available and/or capable of being conducted on the local user devices 160-1 to 160-$n$. As an example, server 105 may be a computer having a processor 110 such as, e.g., an Intel processor, running an appropriate operating system such as, e.g., Windows 2008 R2, Windows Server 2012 R2, Linux operating system, etc. According to the present disclosure, processor 110 may execute software to perform and control the various functions and components of server 105.

FIG. 1 also illustrates further details of server or service provider 105. Processor 110 may control the various functions and components of the server 105 via a control bus 130. Server 105 may also include a memory 125 which may represent at least one of a transitory memory such as RAM, and a non-transitory memory such as a ROM, a Hard Disk Drive (HDD), a Compact Disk (CD) drive or Digital Video Disk (DVD) drive, and/or a flash memory, for processing and storing different files and information as necessary, including computer program products and software, webpages, user interface information, user profiles, user recommendations, user ratings, metadata, electronic program listing information, databases, search engine software, etc., as needed. Search engine and recommender software may be stored in the non-transitory memory 125 of server 105, as necessary, so that media recommendations may be provided, e.g., in response to a user's profile and rating of disinterest and/or interest in certain media assets, and/or for searching using criteria that a user specifies using textual input (e.g., queries using "sports", "adventure", "Angelina Jolie", etc.).

In addition, a server administrator may interact with and configure server 105 to run different applications using different user input/output (I/O) devices 115 as well known in the art. The user I/O or interface devices 115 of the exemplary server 105 may represent e.g., a mouse, touch screen capabilities of a display, a touch and/or a physical keyboard for inputting user data. The user interface devices 115 of the exemplary server 105 may also include a speaker or speakers, and/or other user indicator devices, for outputting visual and/or audio sound, user data and feedback.

Furthermore, server 105 may be connected to network 150 through a communication interface 120 for communicating with other servers or web sites (not shown) and one or more user devices 160-1 to 160-$n$, as shown in FIG. 1. The communication interface 120 may also represent television signal modulator and RF transmitter in the case when the content provider 105 represents a television station, cable or satellite television provider, or other wireless content provider. In addition, one skilled in the art would readily appreciate that other well-known server components, such as, e.g., power supplies, cooling fans, etc., may also be needed, but are not shown in FIG. 1 to simplify the drawing.

User devices 160-1 to 160-$n$ may be immersive reality video rendering devices including one or more displays. The device may employ optics such as lenses in front of each display. The display may also be a part of the immersive display device such as, for example, in the case of smartphones or tablets. In another embodiment, displays and optics may be embedded in a helmet, in glasses, or in a wearable visor which are a part of the device or coupled to the device. The immersive video rendering or user device 160-1 to 160-$n$ may also include one or more sensors and/or external auxiliary devices, as further described below.

User devices 160-1 to 160-$n$ may be one or more of but are not limited to, e.g., a PC, a laptop, a tablet, a smart phone, a smart watch, a video receiver, a smart television (TV), an HMD device or smart glasses (such as, e.g., Oculus Rift (from Oculus VR), PlayStation VR (from Sony), Gear VR (from Samsung), Google Glass (from Google), Moverio BT-200 (from Epson), CastAR, Laster SeeThru, etc.), a set-top box, a gateway, or the like. An example of such devices may be, e.g., a Microsoft Windows 10 computer/tablet/laptop, an Android phone/tablet, an Apple IOS phone/tablet, a Sony TV receiver, or the like. A simplified block diagram of an exemplary user device according to the present disclosure is illustrated in block 160-1 of FIG. 1 as Device 1, and is further described below. Similar components and features may also be present in the other user devices 160-2 to 160-$n$ in FIG. 1.

User device 160-1 may be directly coupled to network/Internet 150 by wired or wireless means through connection or link 155, or through gateway 156 and connections or links 154 and 158. User device 160-1 may include a processor 172 representing at least one processor for processing various data and signals, and for controlling various functions and components of the device 160-1, including video encoding/decoding and processing capabilities in order to play, display, and/or transport video content. The processor 172 may communicate with and controls the various functions and components of the device 160-1 via a control bus 171.

User device 160-1 may also include a display 179 which is driven by a display driver/bus component 177 under the control of processor 172 via a display bus 178. The display 179 may be a touch display. In addition, the type of the display 179 may be, e.g., Liquid Crystal Display (LCD), Light Emitting Diode (LED), Organic Light Emitting Diode (OLED), etc. In addition, an exemplary user device 160-1 according to the present disclosure may have its display outside of the user device, or an additional or a different external display may be used to display the content provided by the display driver/bus component 177. This is illustrated, e.g., by an exemplary external display 185 which is connected through an external display connection 195 of device 160-1. The connection may be a wired or a wireless connection.

Exemplary user device 160-1 may also include a memory 176 which may represent at least one of a transitory memory such as a RAM, and a non-transitory memory such as a ROM, an HDD, a CD drive, a DVD drive, and/or a flash memory, for processing and storing different files and information as necessary, including computer program products and software (e.g., as represented by flow chart diagram 400 of FIG. 4 to be discussed below), webpages, user interface information, databases, etc., as needed. In addition, device 160-1 may also include a communication interface 170 for coupling and communicating to/from server 105 and/or other devices, via, e.g., the network 150 using the link 155, Communication interface 170 may also couple device 160-1 to gateway 156 using the link 158. Links 155 and 158 may represent a connection through, e.g., an Ethernet network, a cable network, a FIOS network, a Wi-Fi network, and/or a cellphone network (e.g., 3G, 4G, LTE, 5G), etc.

One function of an immersive content rendering or user device 160-1 may be to control a virtual camera which captures at least a part of the content structured as a virtual volume. The system may include one or more pose tracking sensors which totally or partially track the user's pose, for example, the pose of the user's head, in order to process the pose of the virtual camera. One or more positioning sensors may be provided to track the displacement of the user. The system may also include other sensors related to the environment for example to measure lighting, temperature or sound conditions. Such sensors may also be related to the body of a user, for instance, to detect or measure sweating or heart rate. Information acquired through these sensors may be used to process the content.

According to the present disclosure, an exemplary device 160-1 may also include a sensor 175. In an exemplary embodiment, sensor 175 may be at least an audio sensor such as a microphone, a visual sensor such as a camera (video or picture), a gyroscope, an accelerometer, a compass, a motion detector, a wearable hand/leg/arm/body band, a glove, a Global Positioning System (GPS) sensor, a Wi-Fi location tracking sensor, a Radio Frequency Identification (RFID) tag (or tracking tag), and/or other types of sensors as previously described.

In another non-limiting embodiment according to the present disclosure, an exemplary external sensor 182, 183 may be separate from and coupled to the user device 160-1 (e.g., placed in the room walls, ceiling, doors, inside another device, on the user, etc.). The exemplary external sensor(s) 182, 183 may have wired or wireless connections 192,193, respectively, to the device 160-1 via an external device interface 173 of the device 160-1, as shown in FIG. 1. External sensor(s) 182, 183 may be, e.g., a microphone, a visual sensor such as a camera (video or picture), a gyroscope, an accelerometer, a compass, a motion detector, a wearable hand/leg/arm/body band, a glove, a Global Positioning System (GPS) sensor, a Wi-Fi location tracking sensor, a Radio Frequency Identification (RFID) tag (or tracking tag), etc. In accordance with the present disclosure, sensor data, e.g., from sensor 175, 182 and/or 183, may be provided to processor 172 of user device 160-1 via processor bus 171 for further processing.

The processor 172 may process the signals received from the sensor 175, 182, 183. Some of the measurements from the sensors may be used to compute the pose and/or position of the device and to control the virtual camera. Sensors which may be used for pose or position estimation include, for instance, gyroscopes, accelerometers or compasses. In more complex systems, a rig of cameras for example may also be used. The processor 172 may perform image processing to estimate the pose of an HMD. Some other measurements may be used to process the content according to environmental conditions or user reactions. Sensors used for detecting environment and user conditions include, for instance, one or more microphones, light sensor or contact sensors. More complex systems may also be used such as, for example, a video camera tracking eyes of a user. In such a case the at least one processor 172 performs image processing to perform the expected measurement.

In addition, exemplary device 160-1 may also include user input/output (I/O) devices 174. The user I/O or interface devices 174 of the exemplary device 160-1 may represent e.g., a mouse, a remote control, a joystick, a touch sensitive surface (e.g. a touchpad or a tactile screen), touch screen capabilities of a display (e.g., display 179 and/or 185), a touch screen and/or a physical keyboard for inputting user data. The user interface devices 174 of the exemplary device 160-1 may also include a speaker or speakers, and/or other user indicator devices, for outputting visual and/or audio sound, user data and feedback. Information from user input devices may be used to process the content, manage user interfaces or to control the pose of the virtual camera.

It is to be understood that sensors 175, 182, 183 and user input devices 174 communicate with the processor 172 within the immersive rendering or user device 160-1 through wired or wireless communication interfaces.

In another non-limiting exemplary embodiment in accordance with the present disclosure, as shown in FIG. 1, device 160-1 may be coupled to at least one external or auxiliary device 181, via external device interface 173 and link 191. Device 181 may be, e.g., a smart phone, a tablet, a remote control, a keyboard device, etc. The external device 181 may include a touch sensitive surface (e.g. a touchpad or a tactile screen) to be utilized as a user interface (UI).

In another non-limiting exemplary embodiment in accordance with the present disclosure, as shown in FIG. 1, device 160-1 may be coupled to an immersive reality HMD device or smart glasses 184 (such as, e.g., Oculus Rift (from Oculus VR), PlayStation VR (from Sony), Gear VR (from Samsung), Google Glass (from Google), Moverio BT-200 (from Epson), CastAR, Laster SeeThru, etc.), via external device interface 173 and link 194. Notice that user device 160-1 may itself be an HMD device or smart glasses. Besides the inherent display, in one embodiment, the HMD device may include at least one embedded camera which may be utilized as a sensor, e.g., for localization (when observing the surroundings) or for user recognition when pointed to the user's eye (e.g., iris recognition). In one embodiment, HMD device may also include an embedded microphone which may be utilized as a sensor or as a voice interface to accept voice commands. In one embodiment, the HMD device may also include a headphone or earbuds for providing audio.

A typical HMD has one or two small displays, with lenses and semi-transparent mirrors embedded in eyeglasses (also termed data glasses), a visor, or a helmet. The display units are miniaturized and may include cathode ray tubes (CRT), liquid crystal displays (LCDs), liquid crystal on silicon (LCos), or organic light-emitting diodes (OLED). Some vendors employ multiple micro-displays to increase total resolution and field of view.

HMDs differ in whether they can display only computer-generated imagery (CGI) or VR content, or only live imagery from the physical world, or a combination. Most HMDs can display only a computer-generated image, sometimes referred to as a virtual image. Some HMDs can allow a CGI to be superimposed on a real-world view (AR, mixed reality, merged reality, etc.) Combining real-world view with CGI can be done by projecting the CGI through a partially reflective mirror and viewing the real world directly. This method is often called optical see-through. Combining real-world view with CGI can also be done electronically by accepting video from a camera and mixing it electronically with CGI. This method is often called video see-through.

Continuing with FIG. 1, exemplary user devices 160-1 to 160-n may access different media assets, recommendations, web pages, services or databases provided by server 105 using, e.g., Hypertext Transfer Protocol (HTTP). A well-known web server software application which may be run by server 105 to service the HTTP protocol is Apache HTTP Server software. Likewise, examples of well-known media server software applications for providing multimedia programs include, e.g., Adobe Media Server and Apple HTTP Live Streaming (HLS) Server. Using media server software as mentioned above and/or other open or proprietary server software, server 105 may provide media content services similar to, e.g., Amazon, Netflix, or M-GO as noted before. Server 105 may also use a streaming protocol such as e.g., Apple HTTP Live Streaming (HLS) protocol, Adobe Real-Time Messaging Protocol (RTMP), Microsoft Silverlight Smooth Streaming Transport Protocol, etc., to transmit various programs including various multimedia assets such as, e.g., movies, TV shows, software, games, electronic books, electronic magazines, etc., to the end-user device 160-1 for purchase and/or viewing via streaming, downloading, receiving or the like.

In one non-limiting exemplary embodiment of the present disclosure, the sensor or sensors 175, 182 and/or 183 may also be connected to the server or service provider 105 by wired (e.g., Ethernet cable) or wireless (e.g., 802.11 standards or Bluetooth) means (e.g., LAN or WAN network) and processor 110 may remotely process some or all of the sensor data.

It is to be understood that the connections or links in FIG. 1, including 140, 155, 154, 158 and 191-195 may each independently be a wired or a wireless connection.

It is to be understood that the various individual components of system 100 in FIG. 1 may be well-known circuits or mechanical components by a person of ordinary skill in the pertinent art and will not be described in detail. It is to be further understood that the example described in FIG. 1 is not exhaustive and other arrangements may be chosen without departing from the scope of the present disclosure.

Figure 2A:
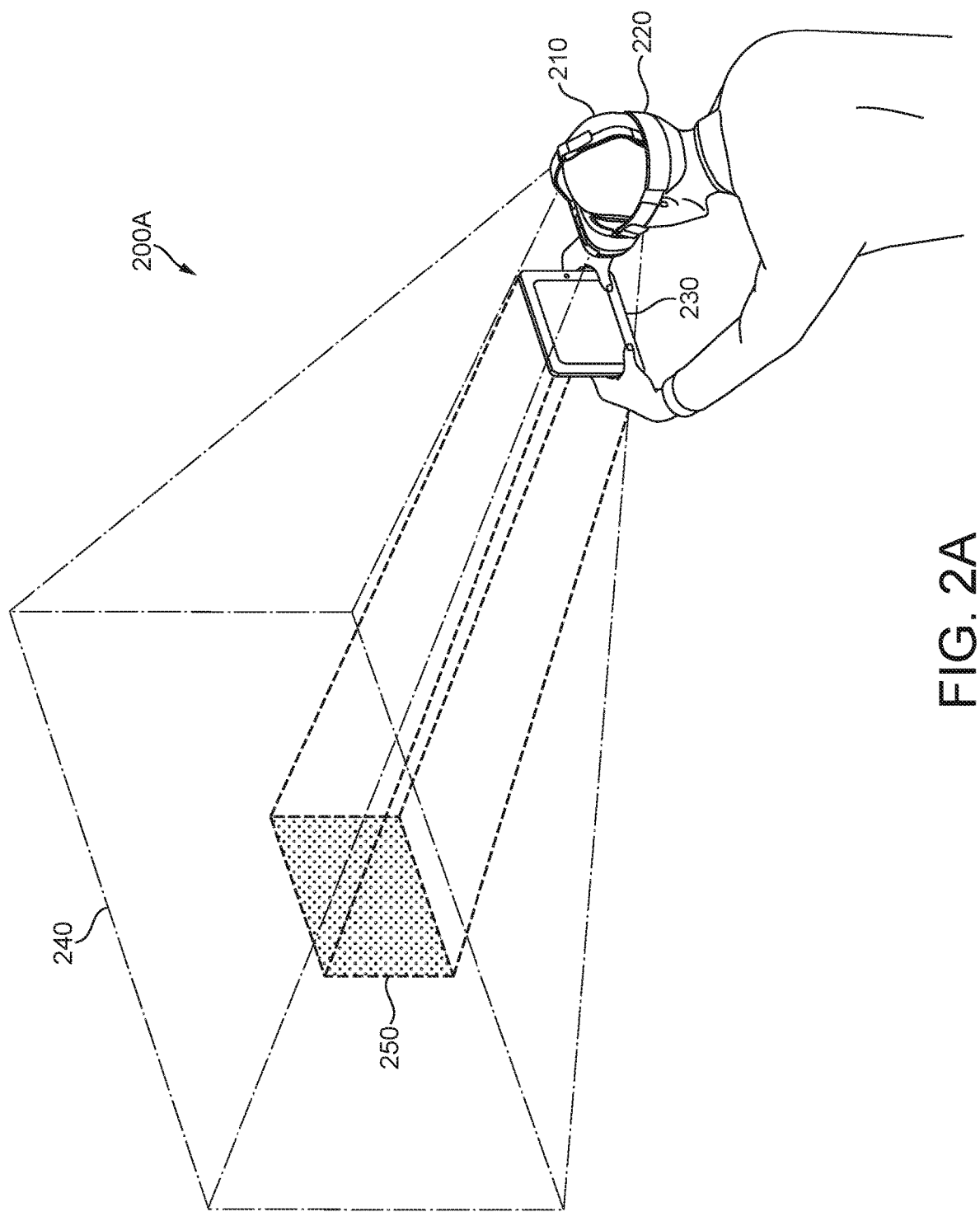
FIG. 2A illustrates a user interacting with a head-mounted display device and a handheld display device in accordance with an embodiment of the present disclosure.

FIG. 2A illustrates drawing 200A of user 210 interacting with HMD device or IR glasses 220 and handheld display device 230 (e.g., a tablet, a smart phone, etc.) in accordance with an embodiment of the present disclosure, where the higher resolution of handheld display device 230 complements the lower resolution of HMD device 220. HMD device 220 may be similar to device 184 of FIG. 1 and coupled to device 160-1, or may be similar to device 160-1 itself including HMD functionality 184, as previously explained. Handheld display device 230 may be similar to external device 181 and coupled to device 160-1, or may be similar to device 160-1 itself, including display functionality 179.

The handheld device 230 and the HMD 220 may be coupled to a server (not shown in FIG. 2A) which controls what is displayed on both devices. The contents of the high resolution window displayed on the handheld device 230 may depend on the relative position and orientation of the device with respect to the HMD. As the handheld display device and HMD are moved, its new location or orientation may be sent to the server and the server may update the displayed content. With respect to FIG. 1, many combinations of devices are possible that reflect FIG. 2A. For example, the server may be device 160-1, HMD 220 may be device 184 and handheld display device 230 may be external device 181. In another example, the server may be gateway 154, HMD 220 may be device 160-1 and handheld display device 230 may be external device 181. In yet another example, the server may be remote server 105, HMD may be device 181 or 184 and handheld display device 230 may be device 160-1. Other combinations are also possible without departing from the scope of the present disclosure.

The server may track the motion of both HMD 220 and handheld display device 230. Using the relative position and orientation of the two devices, the server may calculate the portion (position and scale) of the IR field of view that needs to be displayed on the handheld device 220. It may also synchronize the two views continuously to provide a cohesive combined view to the IR world. It is to be understood that the server may be a separate device, or it may be one of the HMD 220 and the handheld device 230.

FIG. 2A includes a field of view 240 for HMD 220 and a field of view 250 for handheld display device 220 and the two fields of view 240 and 250 intersect. More specifically, in FIG. 2A, the field of view 250 is a subsection of the field of view 240. User 210 may, for example, see or watch a scene in the wide field of view 240 as provided by the IR HMD 220 with the existing (low) resolution available. User 210 may also utilize their handheld display device 230 and move it around, with respect to HMD device 220 field of view, in order to see or watch the content in a higher resolution through the narrow field of view "window" 250 of the handheld display device 230. In addition, user 210 may move its head while keeping handheld display device 230 in place, in order to move the narrow field of view "window" 250 with respect to the wider field of view 240 of the HMD. Moreover, user 210 may zoom in/out the content of handheld display device 230 via settings, gestures or moving handheld display device 230 away/closer to user's eyes. In one embodiment, the opposite is true: user 210 may zoom in/out the content of handheld display device 230 by moving handheld display device 230 closer/away from user's eyes. In one embodiment, zooming in/out may be taken into consideration in the field of view determination, in real time. In one embodiment, zooming in/out may not be taken into consideration in the field of view determination for the handheld display device 230, and the field of view determination for the handheld display device 230 may be made according to a determined amount of zoom. The determined amount of zoom may be established by the user.

It is to be understood that the field of view 240 may be detected or determined from images by at least one video camera and/or data from sensors attached to or included in the HMD 220, or by other cameras and/or sensors coupled to the system, e.g., sensors 182, 183 and 175 in FIG. 1. Similarly, the field of view 250 may be detected or determined from images by at least one video camera and/or data from sensors attached to or included in the handheld display device 230, or by other cameras or sensors coupled to the system, e.g., sensors 182, 183 and 175 in FIG. 1. In addition, a determination of an intersection between the fields of view 240 and 250 may result from a comparison between images from the fields of view 240 and 250. The images may be 2D or 3D images. The sensors may detect position of the respective devices, and field of view and/or intersection may be determined based on the respective positions. A combination of images and positions may also be utilized to determine the fields of view and/or intersection.

The IR content displayed in HMD device 220 may be synchronous with the IR content displayed in handheld display device 230, within constraints associated with data transmission rates. Synchronization may be accomplished by methods well-known in the art, e.g., utilizing time stamps. In addition, IR content displayed in HMD device 220 may be the same IR content displayed in handheld display device 230, albeit with different levels of resolution. Furthermore, IR content displayed in handheld display device 230 may be a subset or smaller window of the IR content displayed in HMD device 220, as previously described.

The IR content may be VR content, AR content, mixed content, merged content, etc. HMD device 220 may operate differently depending on the type of IR content. In addition, HMD device 220 may operate in one of the following modes: optical see-through mode, video see-through mode or mixed optical-video see-through mode. With optical-see-through HMDs, the real world is seen through semi-transparent mirrors placed in front of the user's eyes. These mirrors are also used to reflect the computer generated images into the user's eyes, thereby combining the real- and virtual-world views. With a video see-through HMD, the real-world view is captured with two miniature video cameras mounted on the head gear, and the computer-generated images are electronically combined with the video representation of the real world.

Figure 2B:
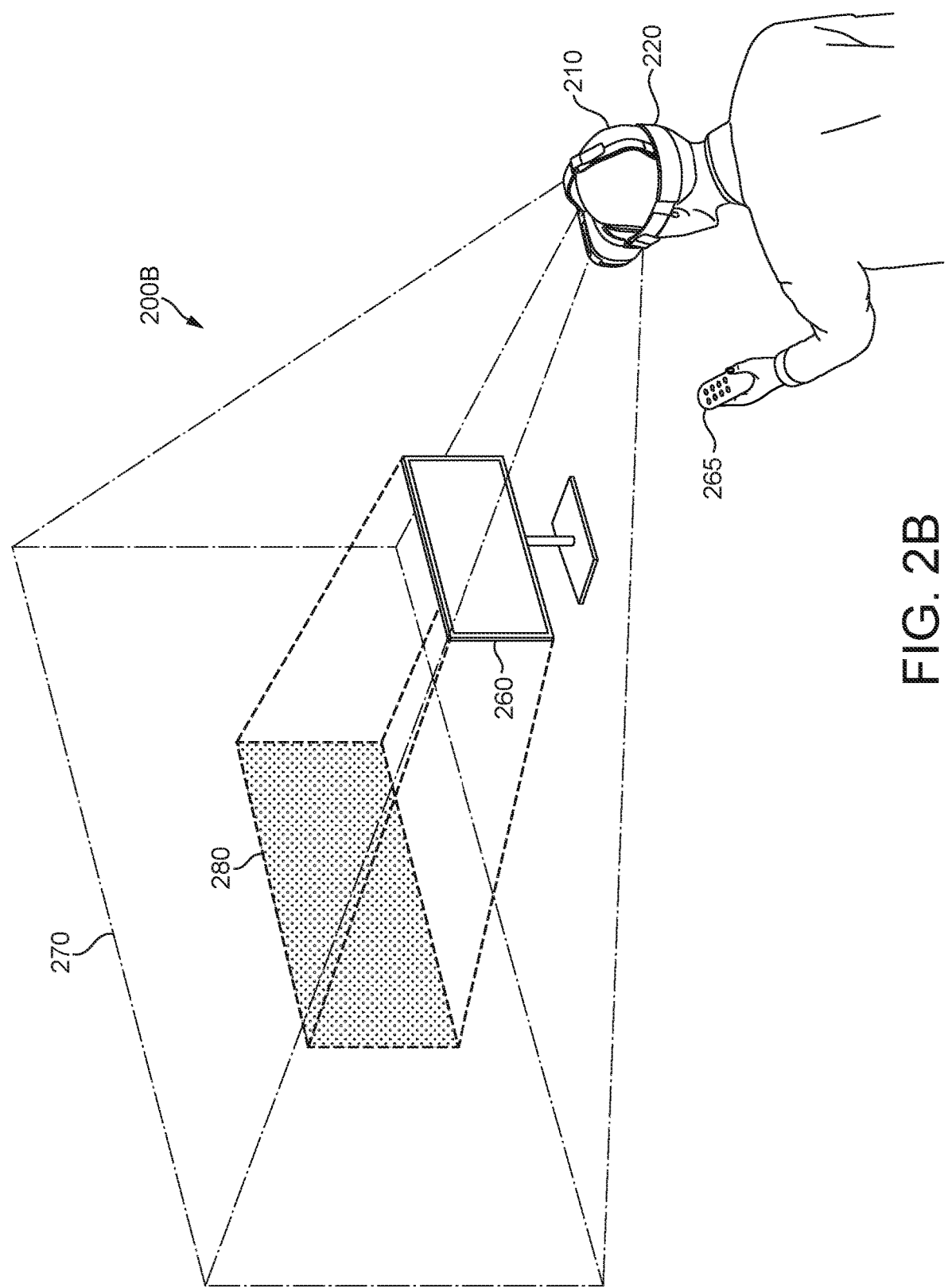
FIG. 2B illustrates a user interacting with a head-mounted display device and a display device in accordance with an embodiment of the present disclosure.

It is to be understood that device 230 does not need to be handheld or mobile. The high resolution IR content may also be displayed on a fixed (non-mobile) display device. FIG. 2B illustrates drawing 200B of user 210 interacting with HMD device 220 and fixed display device 260 (e.g., TV, computer monitor, etc.) in accordance with an embodiment of the present disclosure. In FIG. 2B, the higher resolution of fixed display device 260 complements the lower resolution of HMD device 220. HMD device 220 may be similar to device 184 of FIG. 1 and coupled to device 160-1, or may be similar to device 160-1 itself including HMD functionality 184, as previously explained. Fixed display device 230 may be similar to external device 181, 185 and coupled to device 160-1, or may be similar to device 160-1 itself including display functionality 179. Optionally, user 210 may utilize a remote control device 265 coupled to and controlling the operation of fixed display device 230. Remote control device 265 may be a device similar to device 181, user I/O device 174 or sensor 182,183.

FIG. 2B includes a field of view 270 for HMD 220 and a field of view 280 for fixed display device 220 and the two fields of view 270 and 280 intersect. More specifically, in FIG. 2B, the field of view 280 is a subsection of the field of view 270. User 210 may, for example, see or watch a scene in the wide field of view 270 as provided by the IR HMD 220 with the existing (low) resolution available. User 210 may also see or watch the content in a higher resolution through the narrow field of view "window" 280 of the fixed display device 260. In addition, user 210 may move its head, in order to move the narrow field of view "window" 280 with respect to the wider field of view 270 of the HMD. Moreover, user 210 may zoom in/out the content of fixed display device 260 via settings, by using remote control 265. In one embodiment, user 210 may zoom in/out the content of fixed display device 260 by moving away/closer to fixed display device 260. In one embodiment, the opposite is true: user 210 may zoom in/out the content of fixed display device 260 by moving closer/away to fixed display device 260. In one embodiment, zooming in/out may be taken into consideration in the field of view determination, in real time. In one embodiment, zooming in/out may not be taken into consideration in the field of view determination for the fixed display device 260, and the field of view determination for the fixed display device 260 may be made according to a determined amount of zoom. The determined amount of zoom may be established by the user.

The IR content displayed in HMD device 220 may be synchronous with the IR content displayed in fixed display device 260, within constraints associated with data transmission rates. In addition, IR content displayed in HMD device 220 may be the same IR content displayed in fixed display device 260, albeit with different levels of resolution. Furthermore, IR content displayed in fixed display device 260 may be a subset or smaller window of the IR content displayed in HMD device 220, as previously described.

It is to be understood that the field of view 270 may be detected or determined from images by at least one video camera and/or data from sensors attached to or included in the HMD 220, or by other cameras and/or sensors coupled to the system, e.g., sensors 182, 183 and 175 in FIG. 1. Similarly, the field of view 280 may be detected or determined from images by at least one video camera and/or data from sensors attached to or included in the fixed display device 260, or by other cameras and/or sensors coupled to the system, e.g., sensors 182, 183 and 175 in FIG. 1. In addition, a determination of an intersection between the fields of view 270 and 280 may result from a comparison between images from the fields of view 270 and 280. The images may be 2D or 3D images. The sensors may detect position of the respective devices and field of view and/or intersection may be determined based on the respective positions. A combination of images and positions may also be utilized to determine the fields of view and/or intersection.

The IR content may be VR content, AR content, mixed content, merged content, etc. HMD device 220 may operate differently depending on the type of IR content. In addition, HMD device 220 may operate in one of the following modes: optical see-through mode, video see-through mode or mixed optical-video see-through mode. Additional details of operation are described in association with FIGS. 3A-3E.

Figure 3A:
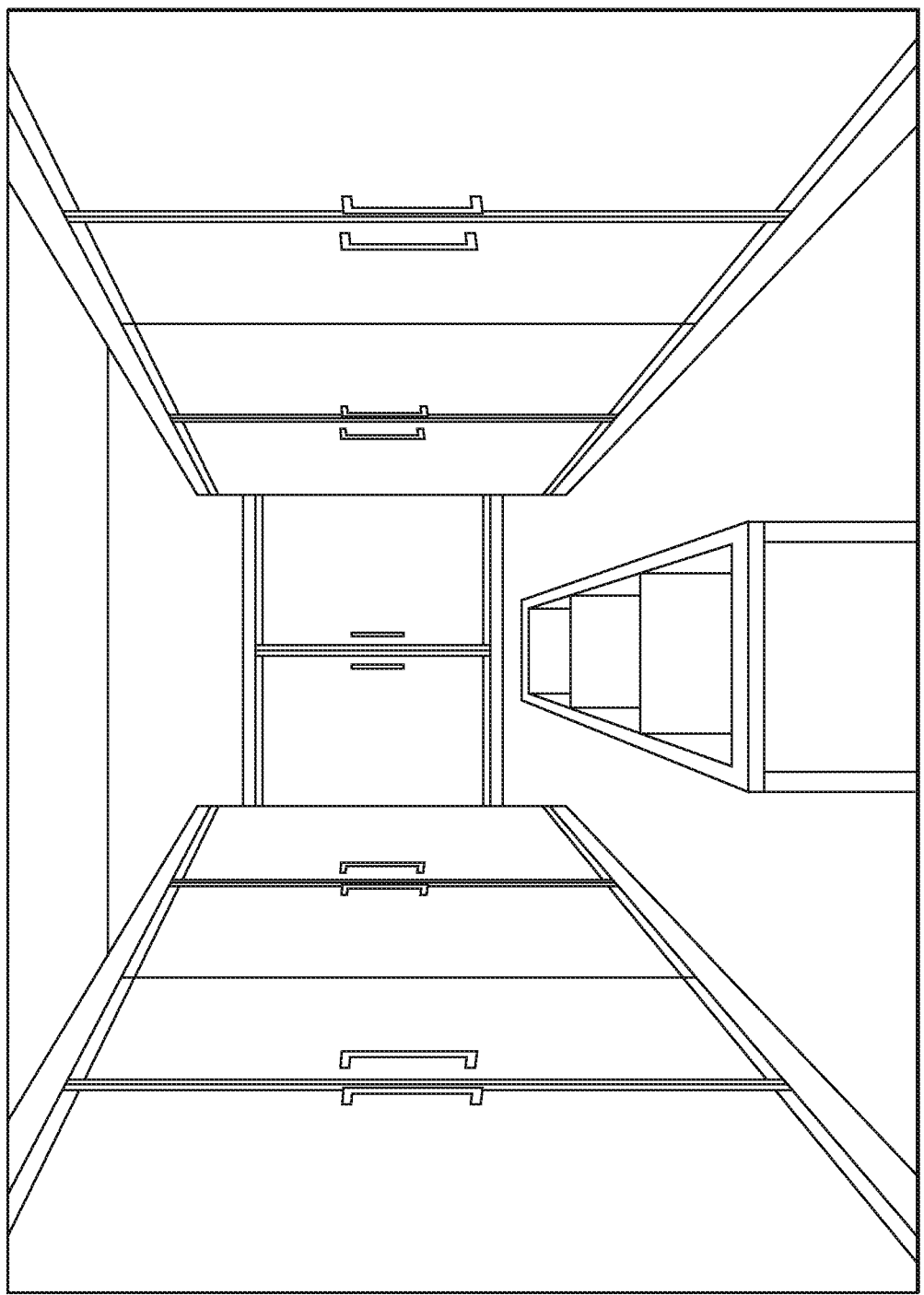
FIG. 3A illustrates a drawing of a view from a head-mounted display device in accordance with an embodiment of the present disclosure.

FIG. 3A illustrates drawing 300A of a view from a head-mounted display device in accordance with an embodiment of the present disclosure. FIG. 3A illustrates a section of frozen products in a supermarket as seen through a user's HMD similar to HMD 220 in FIGS. 2A and 2B. Drawing 300A may reflect the view from an optical see-through HMD illustrating a real view inside of a supermarket. Drawing 300A may also reflect the view from a video see-through HMD illustrating a filmed real scene of a supermarket. Drawing 300A may also reflect the view from an HMD illustrating a VR scene of a supermarket.

Figure 3B:
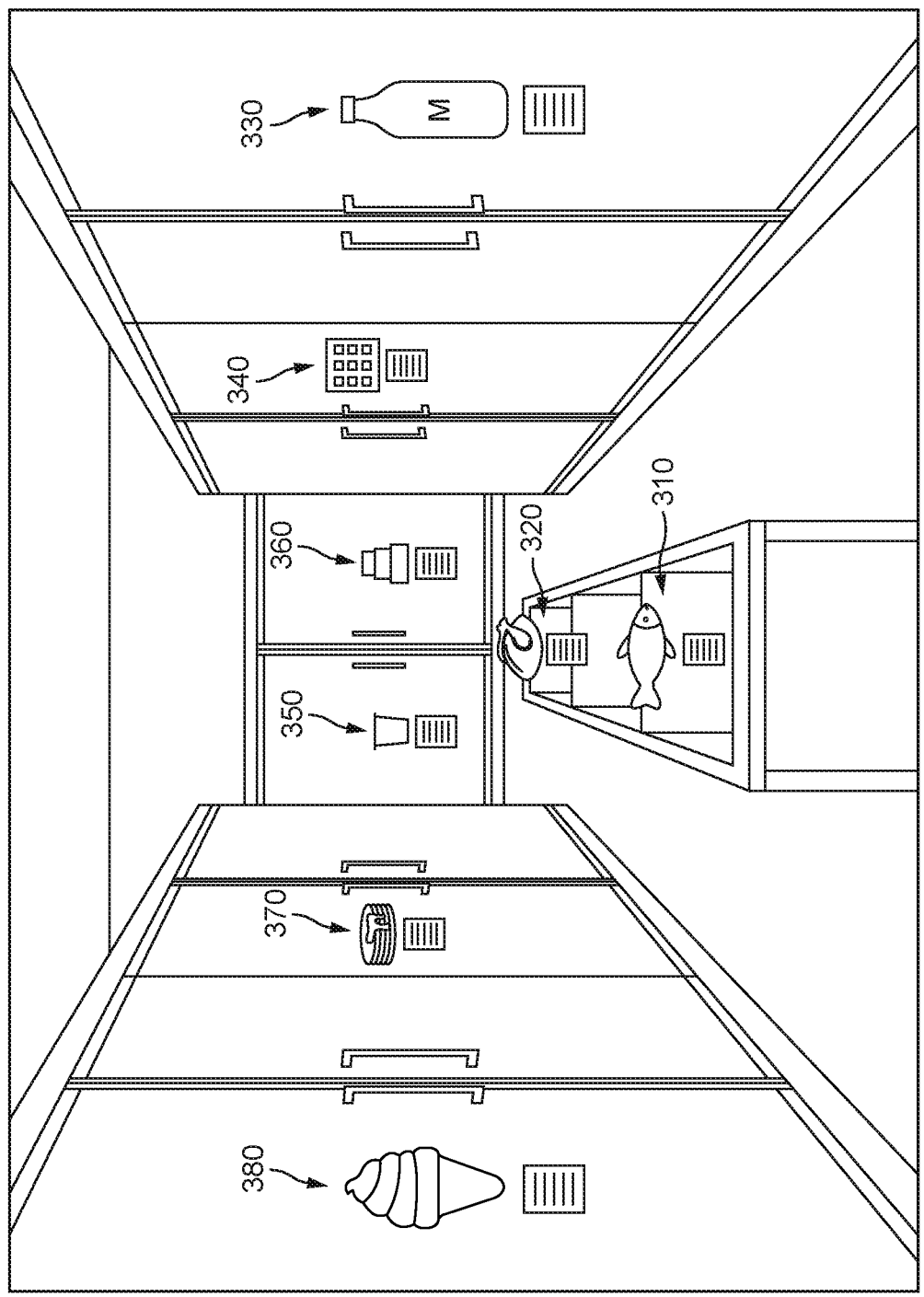
FIG. 3B illustrates a drawing of a view from a head-mounted display device in accordance with an embodiment of the present disclosure.

FIG. 3B illustrates drawing 300B of a view from a head-mounted display device including handheld display device 390, in accordance with an embodiment of the present disclosure. FIG. 3B illustrates a section of frozen products in a supermarket as seen through a user's HMD similar to HMD 220 in FIGS. 2A and 2B. Drawing 300B may reflect the view of AR content via an optical see-through HMD illustrating a real view inside of a supermarket with the addition of AR objects 310-380. Drawing 300B may also reflect the view of AR content via a video see-through HMD illustrating a filmed real scene of a supermarket with the addition of AR objects 310-380. Drawing 300B may also reflect the view from an HMD illustrating a VR scene of a supermarket with VR objects 310-380. Each AR or VR object may be a figure and/or text. In FIG. 3B, objects 310-380 include a figure of the product inside the freezer plus a label including information about the product. In FIG. 3B, the labels of objects 310-380 are not clearly visible or legible due to size and/or resolution.

Figure 3C:
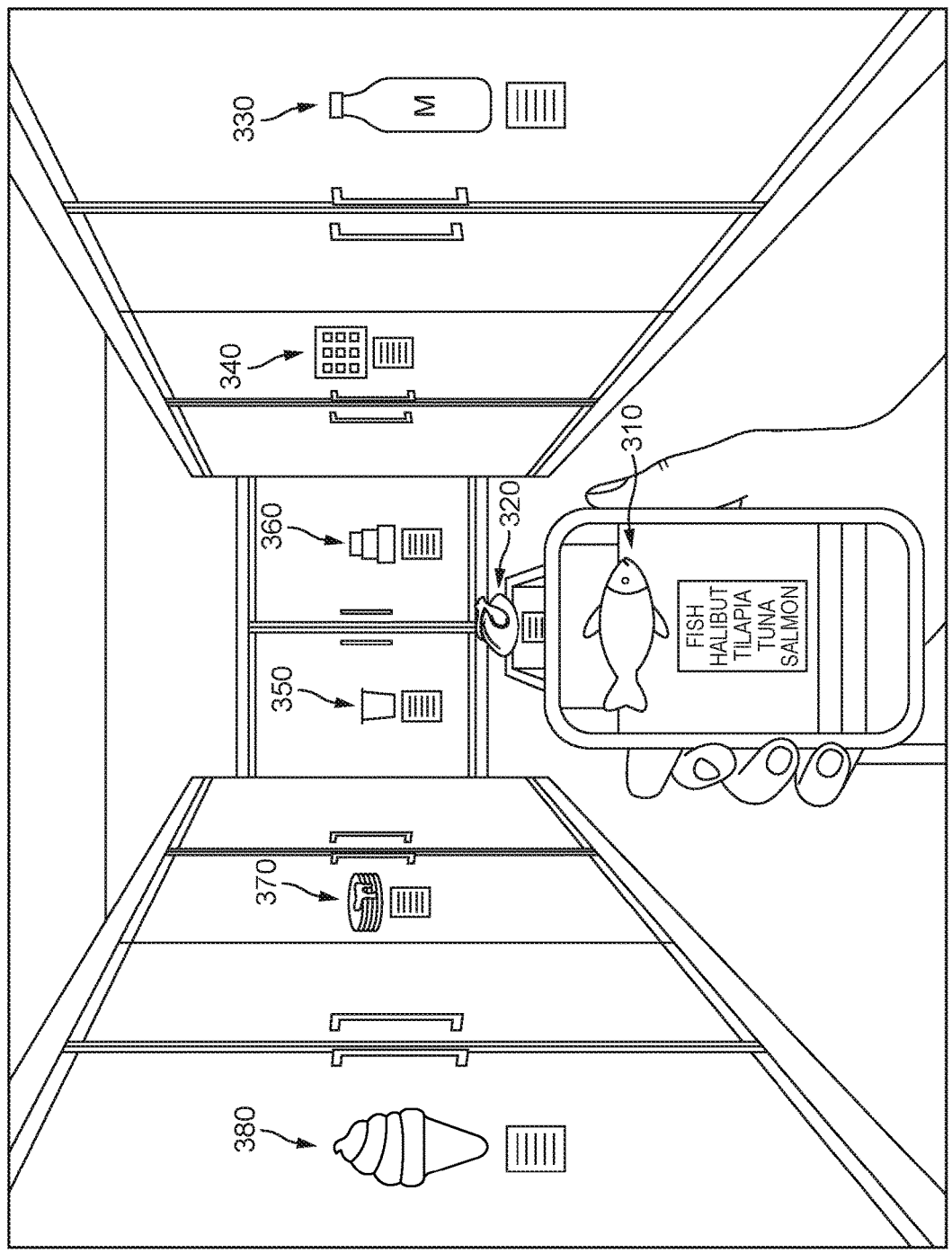
FIG. 3C illustrates a drawing of a view from a head-mounted display device including a handheld display device in accordance with an embodiment of the present disclosure.

FIG. 3C illustrates drawing 300C of a view from a head-mounted display device including handheld display device 390, in accordance with an embodiment of the present disclosure. FIG. 3C illustrates a section of frozen products in a supermarket as seen through a user's HMD similar to HMD 220 in FIGS. 2A and 2B. Drawing 300C may reflect the view of AR content via an optical see-through HMD illustrating a real view inside of a supermarket with the addition of AR objects 310-380. Each AR object may be a figure and/or text. In FIG. 3C, objects 310-380 include a figure of the product inside the freezer plus a label including information about the product. In FIG. 3C, the labels of objects 320-380 are not clearly visible or legible due to size and/or resolution.

FIG. 3C differs from FIG. 3B in that the user's hand 392 holding a handheld display device 390 is visible through the HMD see-through view of drawing 300C. In addition, the screen 395 of handheld display device 390 shows a view of the Fish AR object 315 and surroundings similar to AR object 310 and surroundings of FIG. 3B. Moreover, AR object 315 may be a zoomed in version of AR object 310 of FIG. 3B. As a result, the label in AR object 315 is now legible by the user. Although the example shows a zoomed in display for the handheld device 390, zooming may not be necessary when the handheld device 390 has a higher pixel density, since more details will be present in the image. Hence, handheld device 390 complements the view 300B in FIG. 3B, resulting in view 300C in FIG. 3C, with AR object 315 being legible to the user, as opposed to similar AR object 310 in FIG. 3B. Furthermore, it is to be noted that the HMD view 300C is similar to HMD view 300B in all aspects but AR object 310 and surroundings. AR object 310 is not present in view 300C, due to the presence of handheld display device 390 in the same location. In fact, AR object 315 represents AR object 310 as seen by handheld device 390 on screen 395.

Therefore, according to an embodiment of the present disclosure, when the field of view of the HMD device (e.g., 240) and the field of view of the handheld device (e.g., 250) intersect, any AR objects included in the intersection of the two fields of view (e.g., AR object 310 of FIG. 3B) are not displayed by the HMD device. Instead, the HMD device is actually clear or transparent in the field of view intersection between the HMD device and the handheld device so that the handheld device can be seen in an unobstructed way.

Hence, the HMD displays the handheld device 390, and the handheld device displays any AR objects in the intersection between the two fields of view (e.g., AR object 315). This is to avoid that the HMD view and the handheld device view interfere with each other causing a poor experience to the viewer. By relating FIG. 3C to FIG. 2A, the intersection between fields of view 240 and 250 is field of view 250. Hence, any AR objects within the field of view 250 are not displayed by HMD 220. Instead, they are displayed by handheld display device 230. HMD 220 sees the view from handheld device 230 and the remaining view 240 excluding 250, plus any AR objects contained therein (e.g., AR objects 320-380 in FIG. 3C).

Similarly, by relating FIG. 3C to FIG. 2B, the intersection between fields of view 270 and 280 is field of view 280. Hence, any AR objects within the field of view 280 are not displayed by HMD 220. Instead, they are displayed by fixed display device 260. HMD 220 sees the view from fixed display device 260 and the remaining view 270 excluding 280, plus any AR objects contained therein (e.g., AR objects 320-380 in FIG. 3C).

As previously mentioned fields of view 240, 270 may be detected or determined from images by at least one video camera and/or data from sensors attached to or included in the HMD 220, or by other cameras and/or sensors coupled to the system, e.g., sensors 182, 183 and 175 in FIG. 1. Similarly, the field of view 250 may be detected or determined from images by at least one video camera and/or data from sensors attached to or included in the handheld display device 230, or by other cameras and/or sensors coupled to the system, e.g., sensors 182, 183 and 175 in FIG. 1. Also similarly, the field of view 280 may be detected or determined from images by at least one video camera and/or data from sensors coupled or attached to the fixed display device 260, or by other cameras and/or sensors coupled to the system, e.g., sensors 182, 183 and 175 in FIG. 1. In addition, a determination of an intersection between the fields of view 240 and 250, or 270 and 280 may result from a comparison between images from the respective fields of view. The images may be 2D or 3D images. The sensors may detect position of the respective devices, and field of view and/or intersection may be determined based on the respective positions. A combination of images and positions may also be utilized to determine the fields of view and/or intersection.

In one embodiment, FIG. 3C may also represent a view 300C from a mixed-mode HMD wherein the area around the user's hand 392 and the handheld display device 390 represents a see-through portion of the HMD display and the remaining portions of the view 300C represent a video see-through AR type of image, or a VR type of image. In this case, the see-through area of the HMD is determined based on the intersection between the field of view of the HMD (e.g., 240) and the field of view of the handheld display device (e.g., 250). The intersection is then carved out of the HMD view. The intersection may include the user's hand 392 and or surroundings, just the handheld display device 390 or just the screen 395 of the handheld display device 390.

Figure 3D:
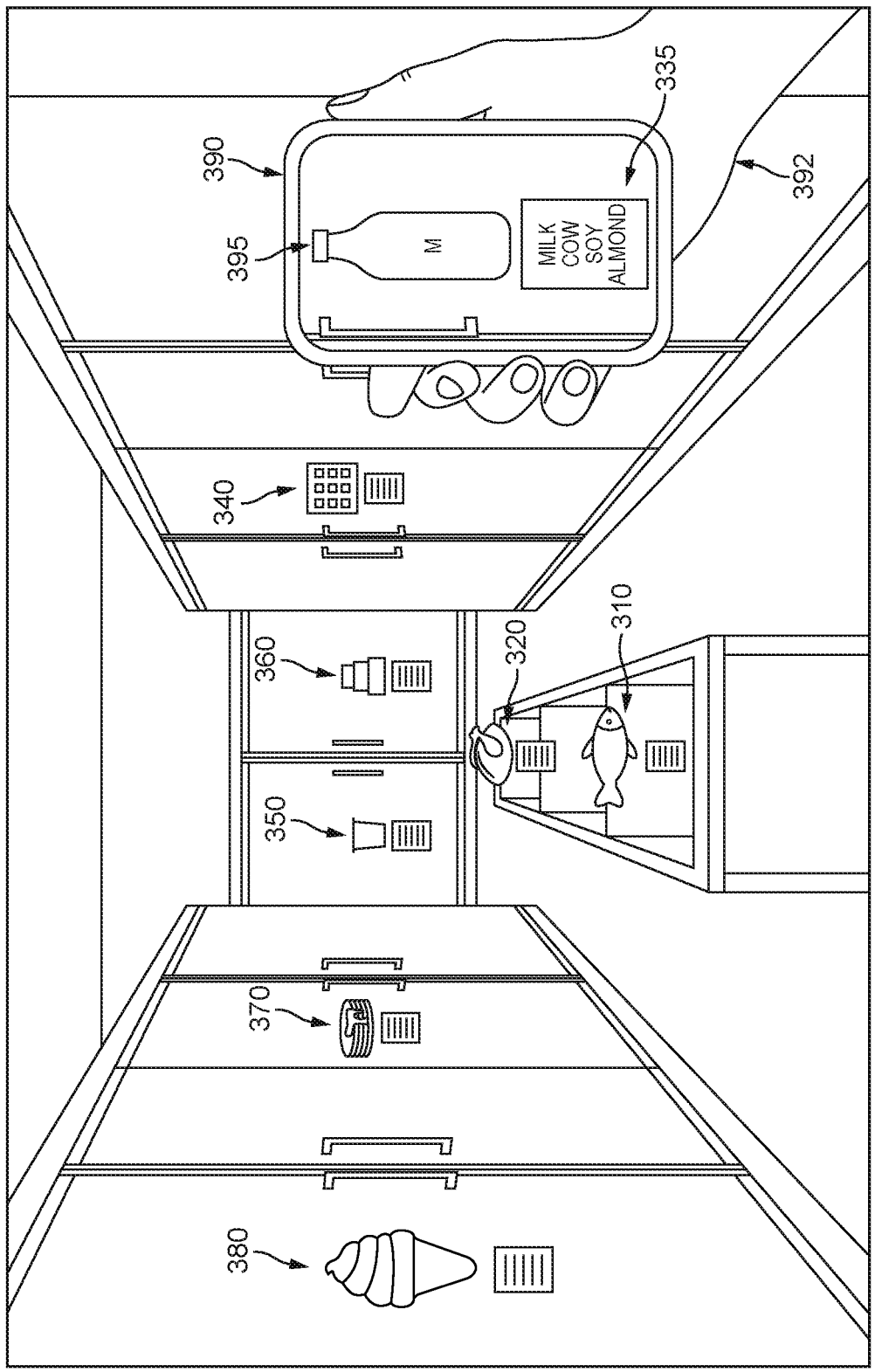
FIG. 3D illustrates a drawing of a view from a head-mounted display device including a handheld display device in accordance with an embodiment of the present disclosure.

FIG. 3D illustrates drawing 300D of a view from a head-mounted display device including handheld display device 390, in accordance with an embodiment of the present disclosure. FIG. 3D is another example similar to FIG. 3C and emphasizes the case where the user's handheld display device is now pointed toward the milk section of the supermarket, instead of the fish section, as in FIG. 3C. Hence, FIG. 3D differs from FIG. 3B in that the user's hand 392 holding a handheld display device 390 is visible through the HMD see-through view of drawing 300D. In addition, the screen 395 of handheld display device 390 shows a view of the Milk AR object 335 and surroundings similar to AR object 330 and surroundings of FIG. 3B. Moreover, AR object 335 may be a zoomed in version of AR object 330 of FIG. 3B. As a result, the label in AR object 335 is now legible by the user. Although the example shows a zoomed in display for the handheld device 390, zooming may not be necessary when the handheld device 390 has a higher pixel density, since more details will be present in the image. Hence, handheld device 390 complements the view 300B in FIG. 3B, resulting in view 300D in FIG. 3C, where AR object 335 is legible to the user, as opposed to similar AR object 330 in FIG. 3B. Furthermore, it is to be noted that the HMD view 300D is similar to HMD view 300B in all aspects but AR object 330 and surroundings. AR object 330 is not present in view 300D, due to the presence of handheld display device 390 in the same location. In fact, AR object 335 represents AR object 330 as seen by handheld device 390 on screen 395.

Figure 3E:
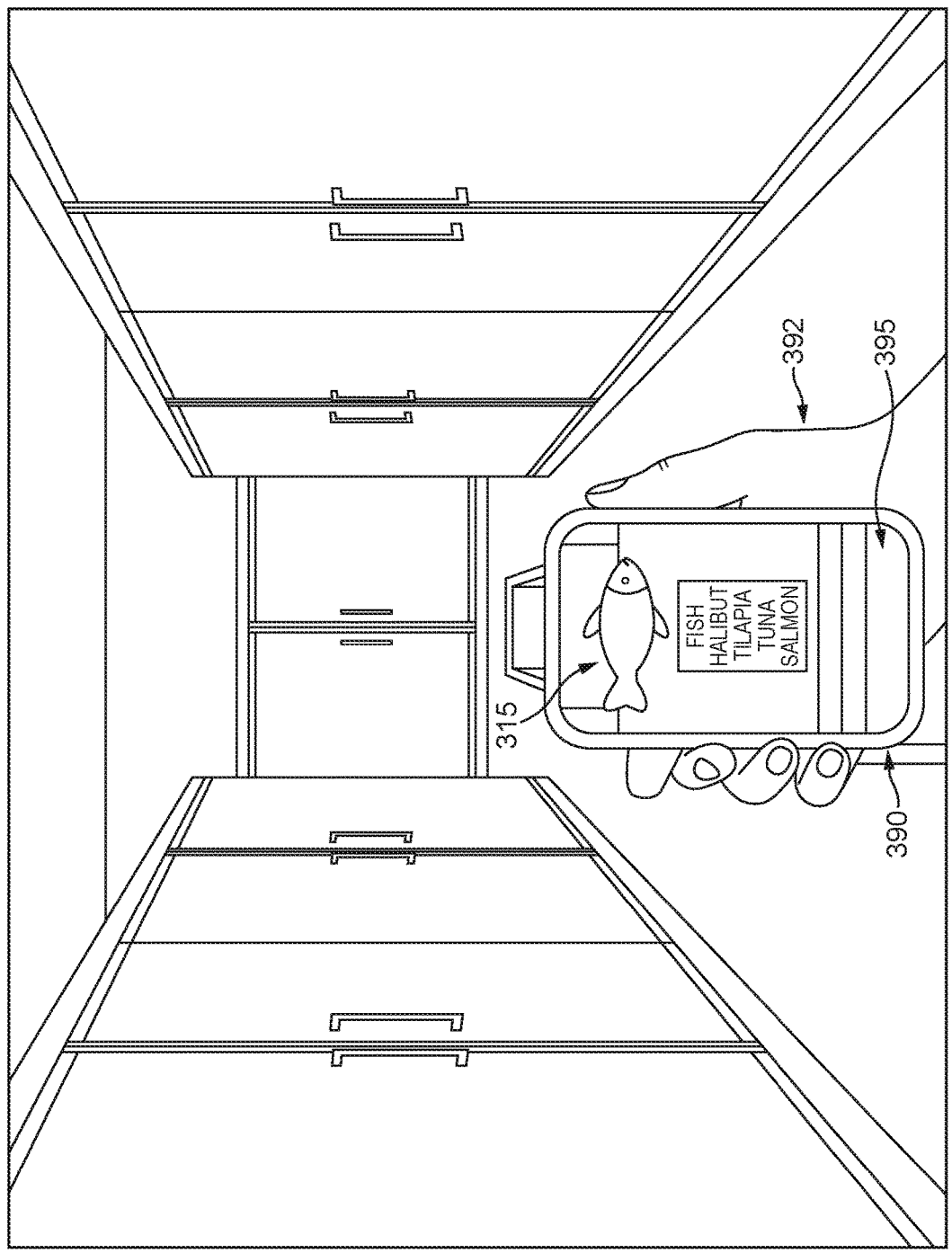
FIG. 3E illustrates a drawing of a view from a head-mounted display device including a handheld display device in accordance with an embodiment of the present disclosure.

FIG. 3E illustrates drawing 300E of a view from a head-mounted display device including handheld display 390 device, in accordance with an embodiment of the present disclosure. In FIG. 3E, only one AR object 315 is shown, as viewed by handheld display device 390. The remaining AR objects are not shown, reflecting yet another embodiment of the present disclosure.

Therefore, according to an embodiment of the present disclosure, when the field of view of the HMD device (e.g., 240) and the field of view of the handheld device (e.g., 250) intersect, any AR objects included in the intersection of the two fields of view (e.g., AR object 310 of FIG. 3B) are displayed by the handheld display device 390 any AR, while the HMD device becomes a completely see-through device. By relating FIG. 3E to FIG. 2A, the intersection between fields of view 240 and 250 is field of view 250. Hence, any AR objects within the field of view 250 are are displayed by handheld display device 230. HMD 220 is see-through and sees the view from handheld device 230.

In this embodiment, the IR content may be shown simultaneously in the HMD and the handheld display device 390. The IR content may also be the same content except for a possible difference in resolution. The IR content sent to the two devices may also be synchronous, within constraints associated with data transmission rates. Once it is determined that the field of view of the two devices intersect, the HMD device may stop showing the IR content altogether and become a see-through device, so that only the content of the handheld display device 390 may be seen by the user. This embodiment is particularly interesting for VR content, but may also apply to other forms of IR content.

In one embodiment, the HMD turns to a complete see-through mode when there is any intersection between the two fields of view. In one embodiment, the HMD only turns to a complete see-through mode when the field of view intersection includes the entire screen 395 of handheld device 390.

It is to be understood that similar examples to FIGS. 3B-3E are possible including a fixed display device (e.g., 260) instead of a handheld display device, taking into consideration that any movement is associated with the HMD and user and not the fixed display device. It is also to be understood that certain situations, e.g., walking around a supermarket, may not represent a real scene or user experience visible with an optical see-through HMD, but a recorded scene visible with a video see-through HMD. Similarly, the view may represent a VR scene.

It is to be understood that there may be additional devices including low and high resolution devices. For example, the user may have two handheld devices, one on each hand. In another example, more than one fixed display device may be placed in a space where the user navigates.

According to one embodiment of the present disclosure, an apparatus 160-1, 181, 184 for providing immersive reality content is provided including a processor 172 and at least one memory 176 coupled to the processor, the processor being configured to determine a field of view intersection between a first field of view from a first device and a second field of view from a second device, generate a first immersive reality (IR) content based on the field of view intersection and provide the first IR content. The first IR content may be provided to the first device. The first IR content may also be provided to the second device or to a third device.

The first device (e.g., HMD) may be, e.g., HMD 184, external physical device 181 or 160-1 itself. The second device (e.g., a smart phone, a tablet, a computer, a computer monitor, a television, etc.) may be, e.g., external physical device 181, display 185, user I/O devices 174, or 160-1 itself (if the first device is a different device). The third device may be similar to the first device or to the second device. The apparatus may be the first device, the second device, the third device, or a fourth device, e.g., a server. If the first field of view and the second field of view do not intersect then the field of view intersection is empty or null. If the first field of view and the second field of view do not intersect then the field of view intersection is non-empty or not null. The IR content may be AR, mixed reality, merged reality, VR, etc.

In one embodiment of the apparatus, the processor may be further configured to generate a second IR content and provide the second IR content. The second IR content may be provided to the second device, to the first device or to a third device. For example, the first IR content and the second IR content may be a picture in picture (PIP) display in a third device displaying the first IR content. In one embodiment, the second IR content may be a function of the second field of view. For example, in AR content, the content is based on the second field of view of the second device. In one embodiment, the second IR content may be based on the field of view intersection, e.g., in AR or VR content. For example, for an IR content, the first IR content may be the entire content and the second IR content may be a portion or window of the first content associated with the field of view intersection. In one embodiment, the second IR content may be a function of the first field of view. For example, in VR content, the second VR content may be equivalent or the same as the first VR content, taking into consideration possible different resolutions and data rates.

In one embodiment of the apparatus, the processor may be further configured to generate the first IR content only in a region of the first field of view outside the field of view intersection. It implies that, when the field of view intersection is empty or null, or equivalently, when the first field of view and the second field of view do not intersect, the processor may be further configured to generate the first IR content in the entire first field of view. And when the field of view intersection is non-empty or not null, or equivalently, when the first field of view and the second field of view intersect, the processor may be further configured to generate the first IR content only in a region of the first field of view not including or outside the field of view intersection. FIGS. 3B-3D are examples satisfying this embodiment.

In one embodiment of the apparatus, the first device may be set to a see-through or transparent display mode in the field of view intersection. FIGS. 3C-3E are examples satisfying this embodiment.

In one embodiment of the apparatus, the processor may be configured to generate the first IR content and provide the first content only when the field of view intersection is empty. Hence, the first IR content may not be generated when the field of view intersection is non-empty, or equivalently, when the first field of view and the second field of view intersect. FIG. 3E is an example satisfying this embodiment.

In one embodiment of the apparatus, the first device may be set to a see-through or transparent display mode when the field of view intersection is non-empty, or equivalently, when the first field of view and the second field of view intersect. FIG. 3E is an example satisfying this embodiment.

In one embodiment of the apparatus, the field of view intersection may be determined based on a position of the first device and a position of the second device. Data may be collected by at least one of various cameras and sensors as previously described.

In one embodiment of the apparatus, the field of view intersection may be determined based on an image intersection between a first view of a scene from the first device and a second view of a scene from the second device. Data may be collected by at least one of various cameras and various cameras and sensors as previously described.

In one embodiment of the apparatus, the processor may be further configured to receive a first view of a scene from the first device and a second view of a scene from the second device.

In one embodiment of the apparatus, the IR content may be an augmented reality (AR) content, the processor being further configured to insert in the first IR content any AR objects associated with a region of the first field of view outside the field of view intersection. FIGS. 3B-3D are examples satisfying this embodiment.

In one embodiment of the apparatus, the IR content may be an augmented reality (AR) content, the processor being further configured to insert only in the second IR content any AR objects associated with the field of view intersection. FIGS. 3C-3E are examples satisfying this embodiment.

In one embodiment of the apparatus, the IR content may be an augmented reality (AR) content, the processor being further configured to insert in the second IR content any AR objects associated with a region of the second field of view outside the field of view intersection.

In one embodiment of the apparatus, the IR content may be a virtual reality (VR) content, the first IR content and the second IR content being the same content.

In one embodiment of the apparatus, the first IR content and the second IR content may be synchronous.

In one embodiment of the apparatus, the first device and the second device may have different resolutions.

In one embodiment of the apparatus, the first IR content may have a lower resolution than the second IR content.

In one embodiment of the apparatus, the first IR content and the second IR content may have different data rate, compression rate, frame rate and/or error correction coding.

In one embodiment of the apparatus, the processor may be further configured to zoom out the second IR content as the distance between the second device and the first device decreases. In one embodiment of the apparatus, the processor may be further configured to zoom out the second IR content as the distance between the second device and the first device increases. In one embodiment of the apparatus, zooming in/out is selectable by the user. Zooming in/out may not be necessary, when the handheld device 390 has a higher pixel density, since more details will be present in the image.

In one embodiment of the apparatus, the processor may be further configured to zoom in the second IR content as the as the distance between the second device and the first device increases. In one embodiment of the apparatus, the processor may be further configured to zoom in the second IR content as the as the distance between the second device and the first device decreases. Zooming in/out may not be necessary, when the handheld device 390 has a higher pixel density, since more details will be present in the image.

In one embodiment of the apparatus, the first device may be a pair of IR glasses or an HMD. FIGS. 2A-2B, 3A-3E are examples satisfying this embodiment.

In one embodiment of the apparatus, the HMD may be an optical see-through when the first IR content is an AR content. FIGS. 2A-2B, 3A-3E are examples satisfying this embodiment.

In one embodiment of the apparatus, the HMD may be a video see-through when the first IR content is an AR content. FIGS. 2A-2B, 3A-3E are examples satisfying this embodiment.

In one embodiment of the apparatus, the second device may be a handheld display device. FIGS. 2A, 3B-3E are examples satisfying this embodiment.

In one embodiment of the apparatus, the second device may be a fixed display device. FIG. 2B is an example satisfying this embodiment.

In one embodiment, the apparatus may be the first device.

In one embodiment, the apparatus may be the second device.

In one embodiment, the apparatus may be a third device coupled to the first device and the second device.

It is to be understood that the term processor may represent at least one processor performing the functions described above in a joint architecture, serial, parallel or mixed.

Figure 4:
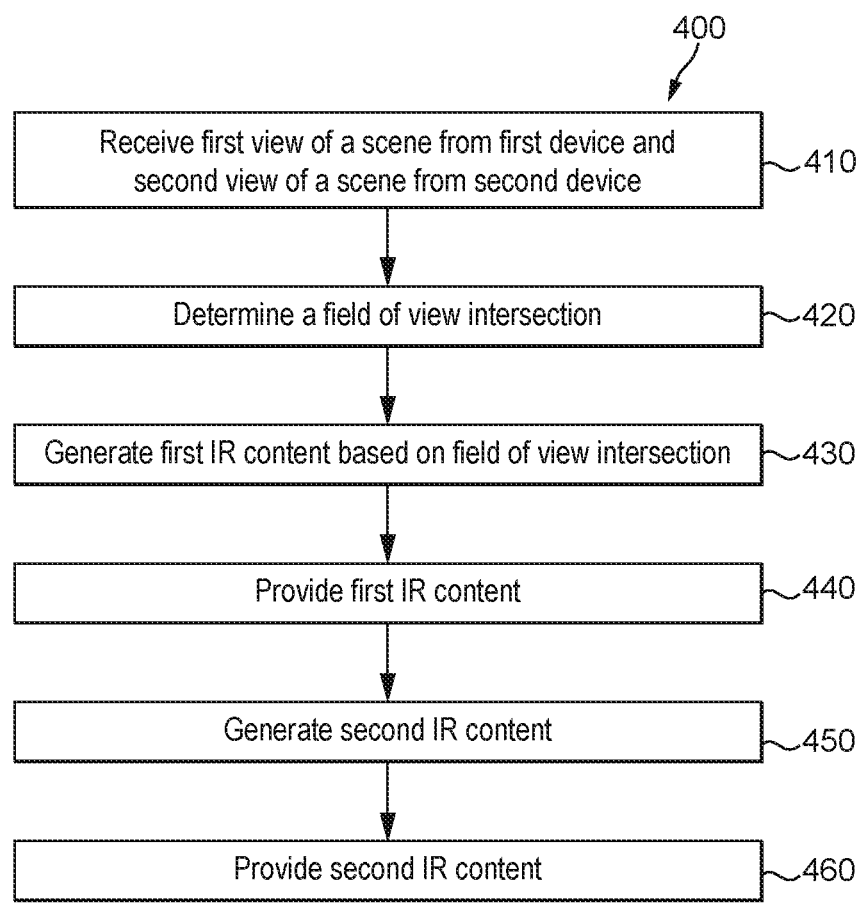
FIG. 4 illustrates a flowchart of an exemplary method in accordance with an embodiment of the present disclosure.

FIG. 4 illustrates a flowchart 400 of an exemplary method of providing immersive reality (IR) content in accordance with the present disclosure. The method may include, at step 420, determining a field of view intersection between a first field of view from a first device and a second field of view from a second device. Then, at step 430, the method may include generating a first IR content based on the field of view intersection. Next, at step 440, the method may include providing the first IR content. The first IR content may be provided to the first device. The first IR content may also be provided to the second device or to a third device.

The method 400 may be performed by, e.g., device 160-1, including any of the embodiments previously described. In particular, the steps of the method may be performed by processor 172. The first device (e.g., HMD) may be, e.g., HMD 184, external physical device 181 or 160-1 itself. The second device (e.g., a smart phone, a tablet, a computer, a computer monitor, a television, etc.) may be, e.g., external physical device 181, display 185, user I/O devices 174, or 160-1 itself (if the first device is a different device). The third device may be similar to the first device or to the second device. The method may be performed by the first device, the second device, the third device, or a fourth device, e.g., a server. If the first field of view and the second field of view do not intersect then the field of view intersection is empty or null. If the first field of view and the second field of view do not intersect then the field of view intersection is non-empty or not null. The IR content may be AR, mixed reality, merged reality, VR, etc.

In one embodiment, the method may further include generating, at step 450, a second IR content and providing, at step 460, the second IR content. The second IR content may be provided to the second device, to the first device or to a third device. For example, the first IR content and the second IR content may be a picture in picture (PIP) display in a third device displaying the first IR content. The steps 450 and 460 may be optional, bypassed or removed. For example, in one embodiment, the steps 450 and 460 may be performed by a separate apparatus (e.g., second device). In one embodiment, the second IR content may be a function of the second field of view. For example, in AR content, the content is based on the second field of view of the second device. In one embodiment, the second IR content may be based on the field of view intersection, e.g., in AR or VR content. For example, for an IR content, the first IR content may be the entire content and the second IR content may be a portion or window of the first content associated with the field of view intersection. In one embodiment, the second IR content may be a function of the first field of view. For example, in VR content, the second VR content may be equivalent or the same as the first VR content, taking into consideration possible different resolutions and data rates.

In one embodiment of the method, the step 430 of generating the first IR content may further include generating the first IR content only in a region of the first field of view outside the field of view intersection. It implies that, when the field of view intersection is empty or null, or equivalently, when the first field of view and the second field of view do not intersect, the step of generating may further include generating the first IR content in the entire first field of view. And when the field of view intersection is non-empty or not null, or equivalently, when the first field of view and the second field of view intersect, the step of generating may further include generating the first IR content only in a region of the first field of view not including or outside the field of view intersection. FIGS. 3B-3D are examples satisfying this embodiment.

In one embodiment of the method, the first device may be set to a see-through or transparent display mode in the field of view intersection. FIGS. 3C-3E are examples satisfying this embodiment.

In one embodiment of the method, the step 430 of generating the first IR content and the step 440 of providing the first IR content may only be performed when the field of view intersection is empty. Hence, the first IR content may not be generated when the field of view intersection is non-empty, or equivalently, when the first field of view and the second field of view intersect. FIG. 3E is an example satisfying this embodiment.

In one embodiment of the method, the first device may be set to a see-through or transparent display mode when the field of view intersection is non-empty, or equivalently, when the first field of view and the second field of view intersect. FIG. 3E is an example satisfying this embodiment.

In one embodiment of the method, the step 420 of determining may be based on a position of the first device and a position of the second device. Data may be collected by at least one of various cameras and sensors as previously described.

In one embodiment of the method, the step 420 of determining may be based on an image intersection between a first view of a scene from the first device and a second view of a scene from the second device. Data may be collected by at least one of various cameras and sensors as previously described.

In one embodiment, the method may further include receiving, at step 410, a first view of a scene from the first device and a second view of a scene from the second device. The step 410 may be optional, bypassed or removed. For example, the step 420 of determining may be based on a position of the first device and a position of the second device.

In one embodiment of the method, the IR content may be an AR content, the step 430 of generating the first IR content further including inserting in the first IR content any AR objects associated with a region of the first field of view outside the field of view intersection. FIGS. 3B-3D are examples satisfying this embodiment.

In one embodiment of the method, the IR content may be an AR content, the step 450 of generating a second IR content further including inserting only in the second IR content any AR objects associated with the field of view intersection. FIGS. 3C-3E are examples satisfying this embodiment.

In one embodiment of the method, the IR content may be an AR content, the step 450 of generating a second IR content further including inserting in the second IR content any AR objects associated with a region of the second field of view outside the field of view intersection.

In one embodiment of the method, the IR content may be a virtual reality (VR) content, the first IR content and the second IR content being the same content.

In one embodiment of the method, the first IR content and the second IR content may be synchronous.

In one embodiment of the method, the first device and the second device may have different resolutions.

In one embodiment of the method, the first IR content may have a lower resolution than the second IR content.

In one embodiment of the method, the first IR content and the second IR content may have different data rate, compression rate, frame rate and/or error correction coding.

In one embodiment of the method, the step 450 of generating a second IR content may further include zooming out the second IR content as the distance between the second device and the first device decreases. In one embodiment of the method, the step 450 of generating a second IR content may further include zooming out the second IR content as the distance between the second device and the first device increases. In one embodiment of the method, zooming in/out is selectable by the user. Zooming in or out may be optional, bypassed or removed.

In one embodiment of the method, the step 450 of generating a second IR content may further include zooming in the second IR content as the as the distance between the second device and the first device increases. In one embodiment of the method, the step 450 of generating a second IR content may further include zooming in the second IR content as the as the distance between the second device and the first device decreases. Zooming in or out may be optional, bypassed or removed.

In one embodiment of the method, the first device may be a pair of IR glasses or an HMD. FIGS. 2A-2B, 3A-3E are examples satisfying this embodiment.

In one embodiment of the method, the HMD may be an optical see-through when the first IR content is an AR content. FIGS. 2A-2B, 3A-3E are examples satisfying this embodiment.

In one embodiment of the method, the HMD may be a video see-through when the first IR content is an AR content. FIGS. 2A-2B, 3A-3E are examples satisfying this embodiment.

In one embodiment of the method, the second device may be a handheld display device. FIGS. 2A, 3B-3E are examples satisfying this embodiment.

In one embodiment of the method, the second device may be a fixed display device. FIG. 2B is an example satisfying this embodiment.

In one embodiment of the method, the steps of the method may be performed by one of the first device.

In one embodiment of the method, the steps of the method may be performed by the second device.

In one embodiment of the method, the steps of the method may be performed by a third device coupled to the first device and the second device.

It is important to note that one or more of the elements in the process 400 may be combined, performed in a different order, or excluded in some embodiments while still implementing the aspects of the present disclosure.

Moreover, method 400 may be implemented as a computer program product including computer executable instructions which may be executed by a processor. The computer program product having the computer-executable instructions may be stored in the respective non-transitory computer-readable storage media of the respective above mentioned device, e.g., 160-1.

According to one aspect of the present disclosure, a non-transitory computer-readable program product is provided including program code instructions for performing any of the embodiments of the method 400 of providing immersive reality content.

According to one aspect of the present disclosure, a non-transitory article of manufacture is provided tangibly embodying computer readable program code instructions which when executed cause a computer to perform any of the embodiments the method 400 of providing immersive reality content.

According to one aspect of the present disclosure, a computer program, comprising code instructions executable by a processor for implementing any of the embodiments the method 400 of providing immersive reality content.

Furthermore, aspects of the present disclosure can take the form of a computer-readable storage medium. Any combination of one or more computer-readable storage medium(s) may be utilized. A computer-readable storage medium can take the form of a computer-readable program product embodied in one or more computer-readable medium(s) and having computer-readable program code embodied thereon that is executable by a computer. A computer-readable storage medium as used herein is considered a non-transitory storage medium given the inherent capability to store the information therein as well as the inherent capability to provide retrieval of the information therefrom. A computer-readable storage medium can be, for example, but is not limited to, an electronic, magnetic, optical, electromagnetic, infrared, or semiconductor system, apparatus, or device, or any suitable combination of the foregoing.

It is to be appreciated that the following, while providing more specific examples of computer-readable storage mediums to which the present disclosure can be applied, is merely an illustrative and not exhaustive listing as is readily appreciated by one of ordinary skill in the art: a portable computer diskette, an HDD, a ROM, an erasable programmable read-only memory (EPROM or Flash memory), a portable compact disc read-only memory (CD-ROM), an optical storage device, a magnetic storage device, or any suitable combination of the foregoing.

According to an aspect of the present disclosure, a computer-readable storage medium is provided carrying a software program including program code instructions for performing any of the embodiments of the method 400 of providing immersive reality content.

It is to be appreciated that the various features shown and described in the present disclosure are interchangeable. Unless otherwise indicated, a feature shown in one embodiment may be incorporated into another embodiment. Further, the features described in the various embodiments may be combined or separated unless otherwise indicated as inseparable or not combinable.

As noted before, the functions of the various elements shown in the figures may be provided through the use of dedicated hardware as well as hardware capable of executing software in association with appropriate software. Also, when provided by a processor, the functions may be provided by a single dedicated processor, by a single shared processor, or by a plurality of individual processors, some of which may be shared.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope of the present disclosure. In addition, individual embodiments can be combined, without departing from the scope of the present disclosure. All such changes and modifications are intended to be included within the scope of the present disclosure as set forth in the appended claims.

The invention claimed is:

1. A method comprising:
   determining a field of view intersection between a first field of view from a first device and a second field of view from a second device based on a position of said first device and a position of said second device; wherein at least one
device is an augmented reality device and the display of one device provide a narrower viewing range than said second device;
   generating a first immersive reality content based on said field of view intersection and
   providing said first immersive reality content but such that any objects included in the intersection of said first and second field of views that are augmented reality objects are not displayed on the device with said narrower viewing range, wherein objects may be inserted in each field of view that may not appear in said first and second field of view intersection.

2. The method of claim 1, wherein said second device is a fixed display device.

3. The method of claim 1, wherein said first device is a mobile display device.

4. The method of claim 1, wherein said first device is an augmented reality head mounted display.

5. The method according to claim 1, further comprising: generating a second immersive reality content; and providing said second immersive reality content.

6. The method of claim 1, wherein said generating said first immersive reality content further comprises:
generating said first immersive reality content only in a region of said first field of view outside said field of view intersection.

7. The method of claim 6, wherein said first device is a mobile display device that displays immersive reality content within its view and said second device is a fixed display device that renders immersive reality content which is within the view intersection.

8. The method of claim 6, wherein said generating said first immersive reality content and said providing said first immersive reality content are only performed when said field of view intersection is empty.

9. The method according to claim 6, wherein said determining is based on a position of said first device and a position of said second device.

10. The method according to claim 6, wherein said immersive reality content is an augmented reality content.

11. The method of claim 10, wherein said generating said second immersive reality content further comprising: inserting only in said second immersive reality content any augmented reality objects associated with said field of view intersection.

12. The method according to claim 10, wherein said first immersive reality content and said second immersive reality content are synchronous.

13. The method according to claim 6, wherein said first immersive reality content has a lower resolution than said second immersive reality content.

14. The method of claim 1, wherein either said first or second device can be used for display of said content and said rendered content is different as provided by said first and second device.

15. An apparatus comprising
a processor and at least one memory coupled to said processor, said processor being configured to:
determine a field of view intersection between a first field of view from a first device and a second field of view from a second device based on a position of said first device and a position of said second device; wherein the display of one device provide a narrower viewing range than said second device;
generate a first immersive reality content based on said field of view intersection; and
provide said first immersive reality content, but such that any objects included in the intersection of said first and second field of views that are augmented reality objects are not displayed on the device with said narrower viewing range, wherein objects may be inserted in each field of view that may not appear in said first and second field of view intersection.

16. An apparatus according to claim 15, wherein said second device is a fixed display device.

17. An apparatus according to claim 15, wherein said first device is a mobile display device.

18. An apparatus according to claim 15, wherein said first device is an augmented reality head mounted display.

19. An apparatus according to claim 15, further comprising:
generating a second immersive reality content; and providing said second immersive reality content.

20. An apparatus according to claim 15, wherein said generating said first immersive reality content further comprises:
generating said first immersive reality content only in a region of said first field of view outside said field of view intersection.

21. An apparatus according to claim 20, wherein said first device is a mobile display device that displays immersive reality content within its view and said second device is a fixed display device that renders immersive reality content which is within the view intersection.

22. An apparatus according to claim 20, wherein said generating said first immersive reality content and said providing said first immersive reality content are only performed when said field of view intersection is empty.

23. An apparatus according to claim 20, wherein said determining is based on a position of said first device and a position of said second device.

24. An apparatus according to claim 20, wherein said immersive reality content is an augmented reality content.

25. An apparatus according to claim 20, wherein said first immersive reality content and said second immersive reality content are synchronous.

26. An apparatus according to claim 15, wherein either said first or second device can be used for display of said content and said rendered content is different as provided by said first and second device.

\* \* \* \* \*

UNITED STATES PATENT AND TRADEMARK OFFICE
CERTIFICATE OF CORRECTION

| | |
|---|---|
| PATENT NO. | : 11,119,567 B2 |
| APPLICATION NO. | : 16/496857 |
| DATED | : September 14, 2021 |
| INVENTOR(S) | : Shahab Hamidi-Rad, Kent Lyons and Alan Zhang |

It is certified that error appears in the above-identified patent and that said Letters Patent is hereby corrected as shown below:

In the Claims

Column 22, Line 53, (in Claim 1) delete "provide" and insert --provides--.

Column 23, Line 40, (in Claim 15) delete "comprising" and insert --comprising:--.

Column 23, Line 47, (in Claim 15) delete "provide" and insert --provides--.

Signed and Sealed this
Twentieth Day of December, 2022

*Katherine Kelly Vidal*
*Director of the United States Patent and Trademark Office*